Dec. 24, 1963   J. RODRIGUEZ ETAL   3,115,170
CHERRY CLUSTER CUTTING MACHINE
Filed May 14, 1962   4 Sheets-Sheet 1

INVENTORS
Jose Rodriguez
Rudolph Rodriguez

BY Webster & Webster
ATTYS.

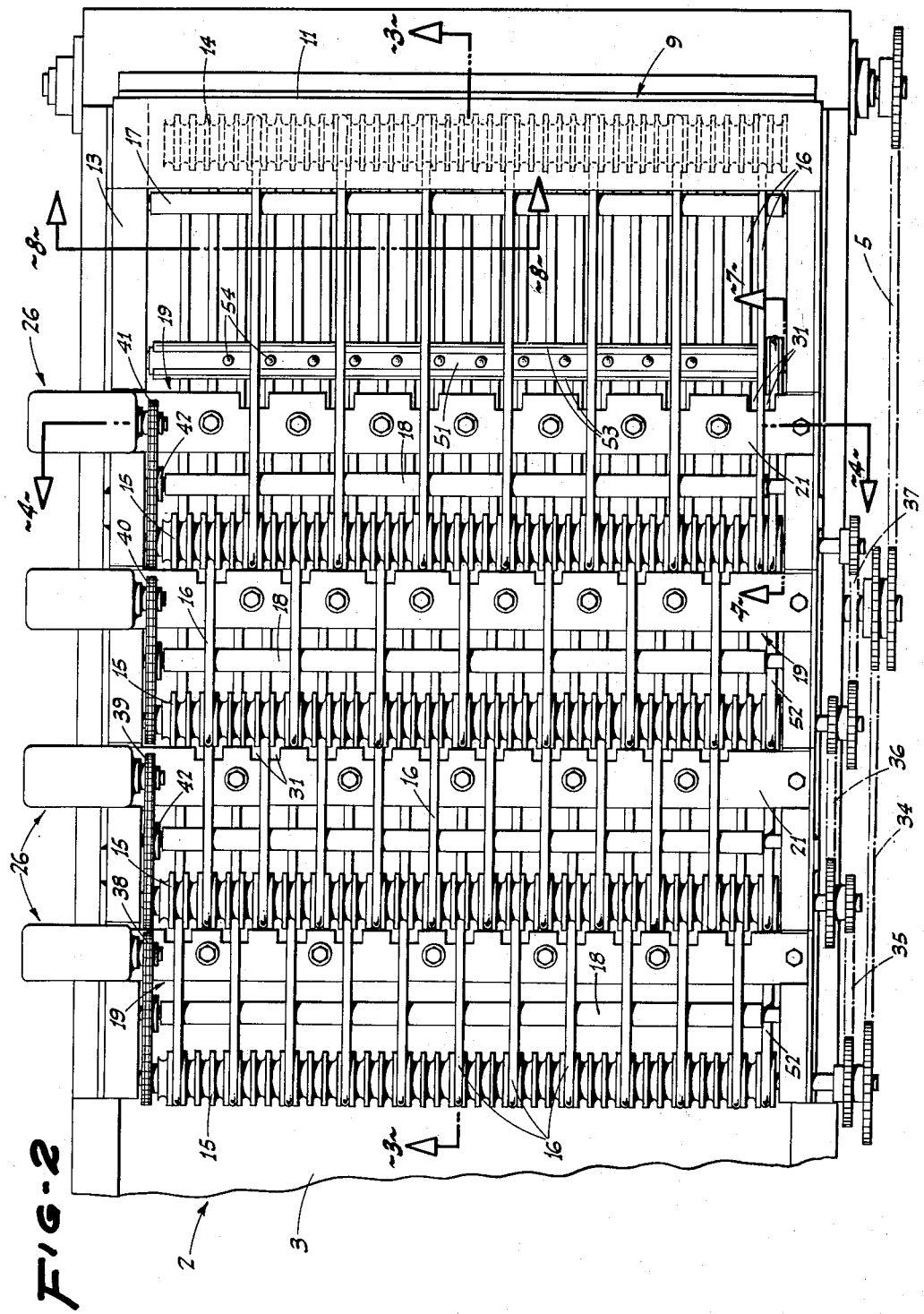

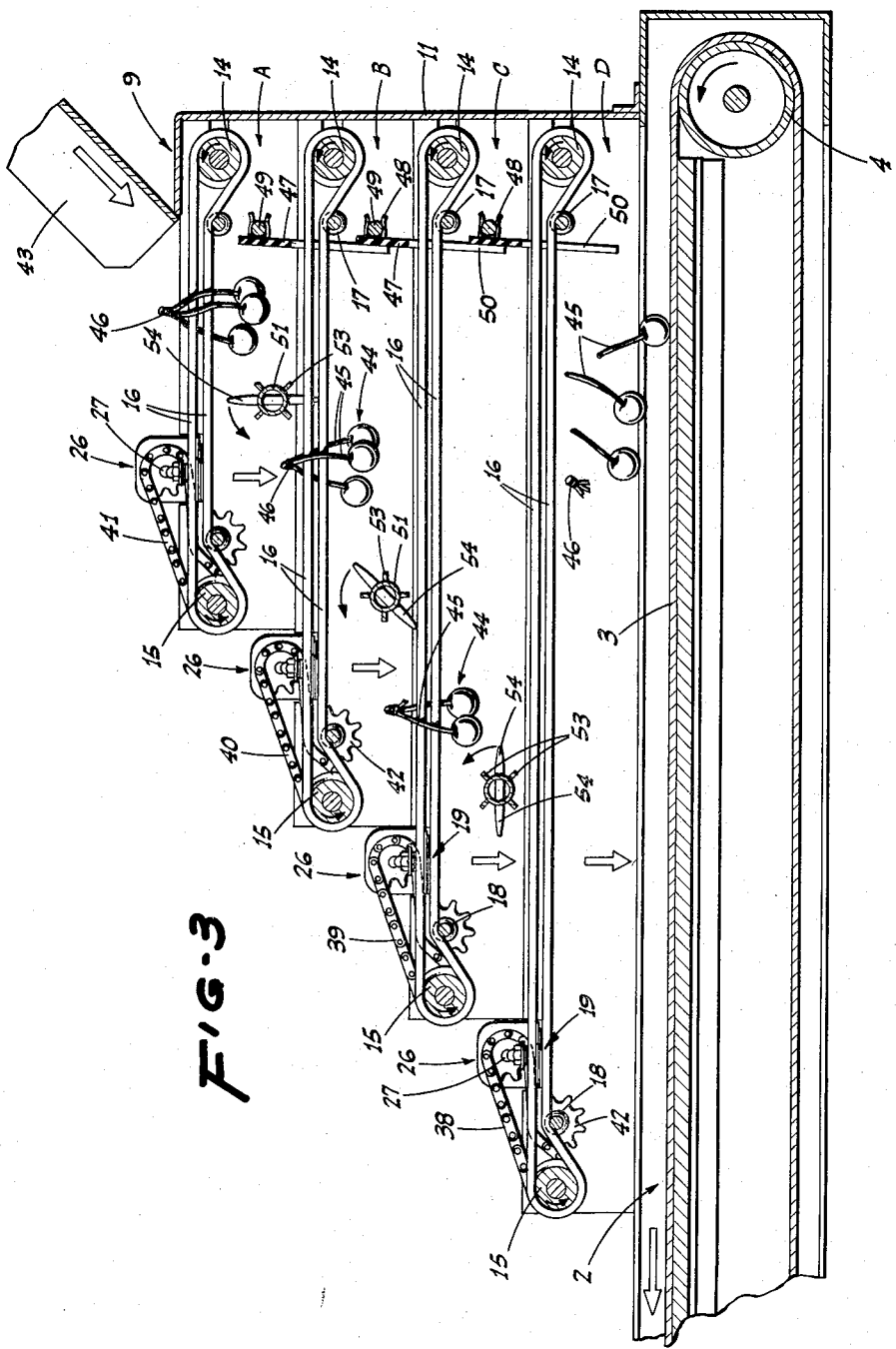

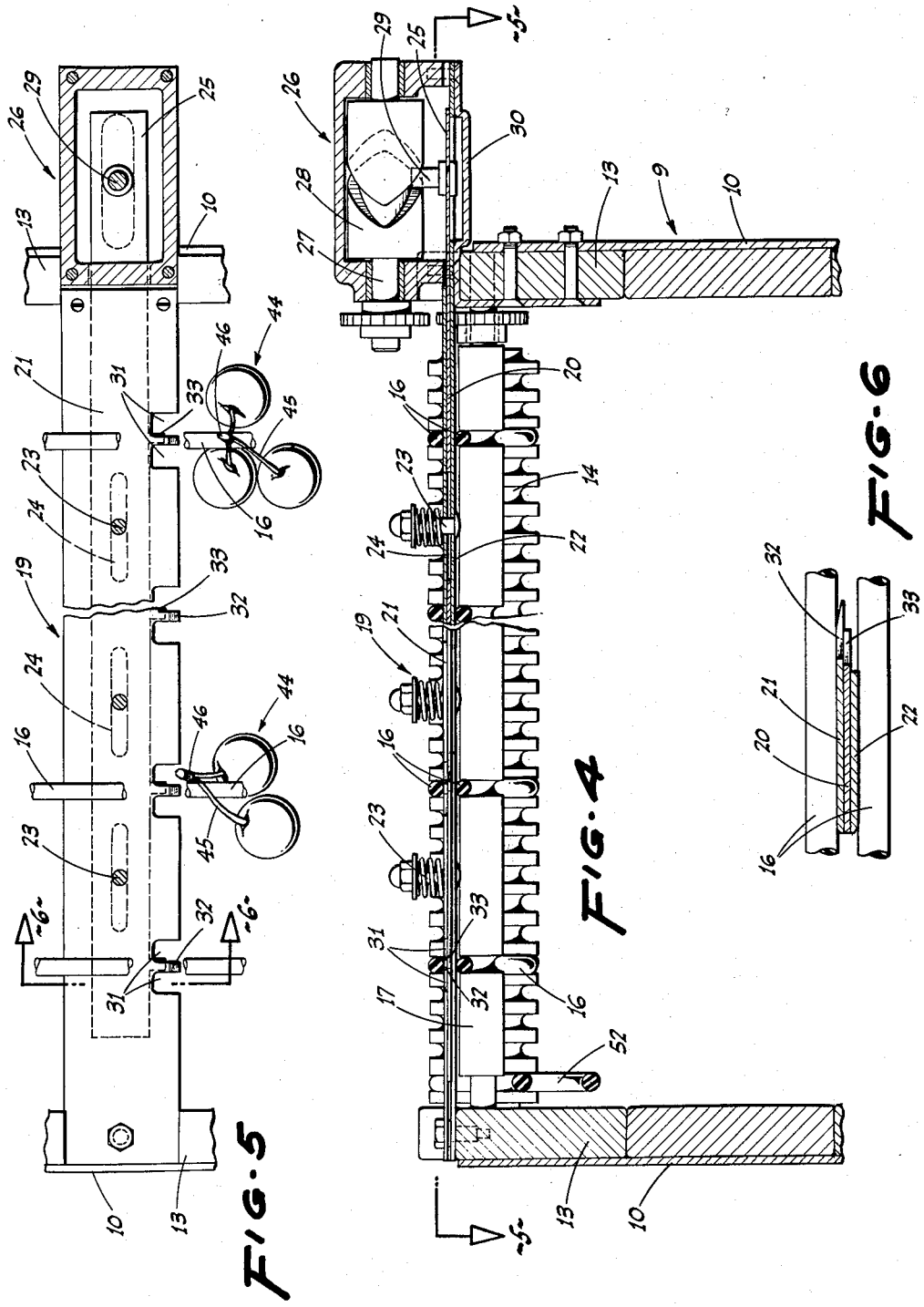

Patent text 3,115,170
CHERRY CLUSTER CUTTING MACHINE
Jose Rodriguez, 104 W. 10th St., Stockton, Calif., and Rudolph Rodriguez, Stockton, Calif.; said Rudolph Rodriguez assignor to said Jose Rodriguez
Filed May 14, 1962, Ser. No. 194,425
3 Claims. (Cl. 146—1)

The present invention relates in general to a machine for use in the cherry packing industry. Cherries as picked from the tree are quite frequently in clusters; i.e., usually two or three cherries having their stems connected at the apex of the cluster by a nub.

In order to pack such cherries individually and each with a free stem, which is the practice, it is necessary that the clusters first be cut apart. This is accomplished by severing the stems of the individual cherries at or adjacent the connecting nub of the cluster.

The major object of the present invention is to provide a novel machine for so cutting cherry clusters apart; the machine functioning in a ready and efficient manner and having a substantial capacity, yet being operative without an undue percentage of clusters passing uncut.

Another important object of the invention is to provide a machine, as above, which embodies a plurality of novel cluster cutting units disposed in stacked or tier array; such units being adapted to catch and cut apart cherry clusters fed from above the stack.

The arrangement is such that while the cherry clusters may pass downward throught the successive units, seldom does a cluster pass through all of such units without being caught and acted upon by one thereof.

An additional object of the invention is to provide a machine, of the type described, wherein each of the cluster cutting units includes—in combination—a plurality of driven longitudinally extending endless belts, and a transverse sickle bar device spanning such belts in closely adjacent relation; the belts being adapted to catch cherry clusters in straddling relation and to then advance such clusters into engagement with the sickle bar device; the latter then acting to cut the clusters apart by severing the stems adjacent the nub.

It is also an object of the invention to provide a practical, reliable, and durable cherry cluster cutting machine, and one which will be exceedingly effective for the purpose for which it is designed.

These objects are accomplished by means of such structure and relative arrangement of parts as will fully appear by a perusal of the following specification and claims.

In the drawings:

FIG. 2 is an enlarged top plan view of the machine as shown in FIG. 1.

FIG. 3 is a longitudinal sectional elevation on line 3—3 of FIG. 2.

FIG. 4 is a transverse elevation, partly in section, further enlarged and on line 4—4 of FIG. 2; the view showing—primarily—one of the sickle bar devices.

FIG. 5 is a fragmentary foreshortened plan view, on line 5—5 of FIG. 4, of such sickle bar device, such view being partly in section.

FIG. 6 is an enlarged fragmentary cross section on line 6—6 of FIG. 5.

Figure 1:
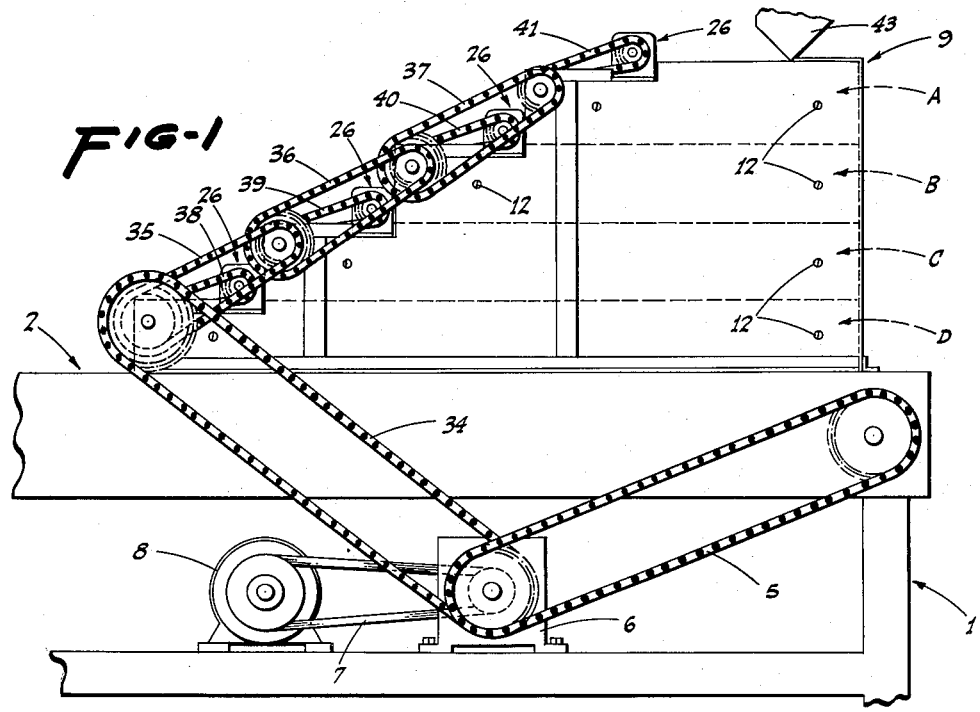
FIG. 1 is a side elevation of the machine; the receiving and carry-off conveyor, and the frame, being partly broken away.
Figure 7:
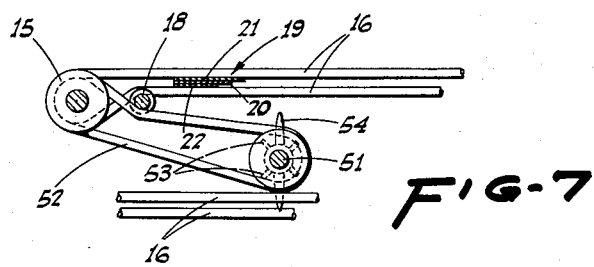
FIG. 7 is a fragmentary, somewhat diagrammatic, longitudinal, elevation taken on line 7—7 of FIG. 2.
Figure 8:
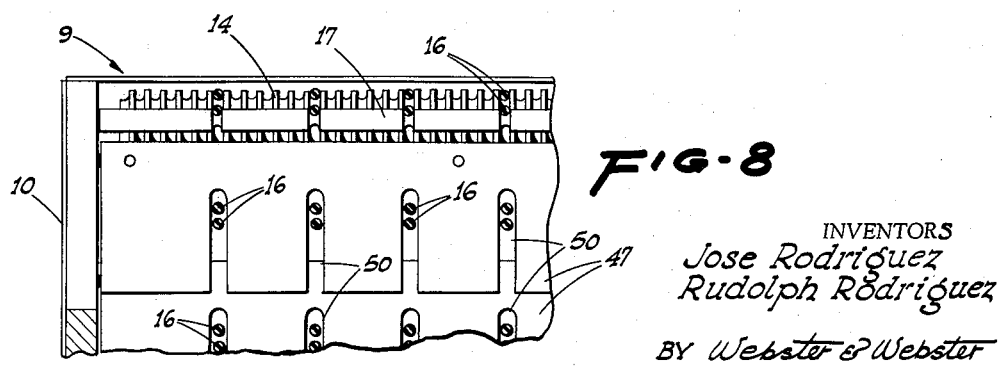
FIG. 8 is a fragmentary transverse elevation, partly in section, taken on line 8—8 of FIG. 2.

Referring now more particularly to the drawings, and to the characters of reference marked thereon, the machine comprises a horizontally enlongated, upstanding main frame, indicated generally at 1, which main frame carries an endless receiving and carry-off conveyor, indicated generally at 2. The conveyor is of conventional construction and includes a flat endless belt 3 supported at its ends by rollers, one of which is indicated at 4; the roller 4 being rotated in the direction indicated by an endless chain drive 5 actuated from a speed-reduction gear box 6, which in turn is belt driven, as at 7, from an electric motor 8. The speed-reduction gear box 6 also serves to operate other parts of the machine, as will hereinafter appear.

Above the rear end of the conveyor 2 the machine includes—in stacked or tier array—a plurality of cluster cutting units, here four in number, identified progressively from top to bottom at A, B, C, and D.

The stack of such cluster cutting units A, B, C, and D is supported on the frame 1 and is confined by a housing, indicated at 9, open at the top, bottom, and front; such housing 9 including side walls 10 and a back wall 11. The cluster cutting units are held in place in the housing 9 by screws 12; the latter extending through the side walls 10 and being engaged in side bars 13 of each cluster cutting unit.

As such cluster cutting units are generally of like construction, except for length, and the number and spacing of the endless belts thereof, a description of one such unit will suffice for all; like reference numerals being used in the identification of the parts of each such unit.

Each cluster cutting unit (A, B, C, and D) includes in association with the side bars 13 thereof, a rear multiple-groove pulley shaft 14 and a forward multiple-groove pulley shaft 15; such pulley shafts 14 and 15 being suitably journaled, at the ends, in the side bars 13.

A multiplicity of endless belts 16 are trained about and extend between the pulley shafts 14 and 15, with said belts disposed in transversely spaced relation. The endless belts 16, which are preferably of rubber, are circular and of relatively small diameter in cross section; this to the end that cherry clusters may readily straddle such belts, as will hereinafter be described.

The lower runs to the endless belts 16 are maintained relatively close to but spaced from the upper runs by means of a rear idler roller 17 and a forward idler roller 18 over which said lower runs travel. By so disposing the lower runs of the endless belts 16 the chance of a cherry cluster catching on said lower runs and moving rearwardly is minimized.

A sickle bar device, indicated generally at 19, extends transversely of each cluster cutting unit adjacent but short of the forward pulley shaft 15; such sickle bar device 19 spanning between and being secured in connection with the related side bars 13. Between such side bars the sickle bar device extends through the endless belt 16 between the upper and lower runs thereof, and such sickle bar device is comprised of the following:

An elongated, reciprocable blade 20 is carried between a fixed upper plate 21 and a fixed lower plate 22; the reciprocable blade 20 being guided, and maintained in close contact between the plates 21 and 22, by means of spring-tensioned bolts 23 which pass through the assembly; the reciprocable blade 20 having elongated slots 24 in which the bolts 23 engage, as shown. The reciprocable blade 20 extends at one end, as at 25, beyond the corresponding side bar 13, and into a device, indicated generally at 26, operative to reciprocate said blade.

The blade reciprocating device includes a shaft 27 fitted, within a suitable housing, with an eccentrically grooved cam 28; the adjacent part 25 of the blade 20 being fitted with a pin 29 which rides in the groove of said cam. Thus, upon rotation of the shaft 27 the pin 29 is recurringly worked back and forth by the cam 28, with resultant reciprocation of the blade 20. The blade reciprocating device 26 is suitably supported from the adjacent side bar by an outboard bracket 30; the manner of driving such blade reciprocating device to hereinafter appear.

As previously pointed out the upper run of each of the endless belts 16 extends in closely adjacent relation across the top of the sickle bar 19; the fixed upper plate 21 being formed with rearwardly opening notches 31 on opposite sides of each such upper run whereby to define a rearwardly projecting guard tooth 32 directly above such run. The reciprocable blade 20 is likewise formed with a rearwardly projecting cutter tooth 33 corresponding to each guard tooth 32 and working in a plane therebelow across the notches 31 alternately as the blade 20 reciprocates. It will thus be apparent that anything carried by the upper runs of the belts 16 into the notches 31 will be severed by the cutter teeth 33 as they shuttle across the notches 31.

The forward multiple-groove pulley shafts 15 are all simultaneously driven, with the upper runs of the endless belts 16 traveling forward, in the following manner:

An endless chain drive 34 extends from the speed-reduction gear box 6 to the pulley shaft 15 of the lowermost cluster cutting unit; i.e., the unit D. The pulley shafts 15 of the remaining cluster cutting units, and which are successively stepped upwardly and rearwardly by reason of differential length of such units, are driven in succession—but simultaneously—by endless chain drives, indicated at 35, 36, and 37. The drives 34, 35, 36, and 37 are all on the same side of the machine, and the sickle bar devices 19, as mounted on the opposite side of the machine, are each driven from the related pulley shaft by an endless chain drive; such endless chain drives being indicated at 38, 39, 40, and 41, and each connecting with the shaft 27 of the corresponding blade reciprocating device 26.

Idler sprockets 42 on the adjacent end of the related forward idler rollers 18 cooperate in upwardly deflecting relation with the lower runs of the endless chain drives 38, 39, 40, and 41.

With the assembly of the chain drives 34–41 inclusive the endless belts 16 are all simultaneously driven, with the upper runs traveling forward, and with the sickle bar devices 19 all in operation.

The number and transverse spacing of the endless belts 16 of the cluster cutting units A, B, C, and D are such that in the fruit gravity-drop area defined by the cluster cutting unit A, substantially all of the belts—as between the different units—are in transversely staggered relation to each other whereby to leave no free vertical fallways of any substantial width.

When the machine is in operation fresh cherries are fed by a chute 43 from a point directly above the cluster cutting unit A. Those cherries which are "singles" merely drop through all of the units and are received on the carry-off conveyor 2. However, the cherries that are in clusters 44 are received in straddling relation on the upper run of one or another of the endless belts 16 of the cluster cutting units. As such cluster cutting units are in a stack or tier array it is infrequent that a cluster 44 will gravitationally drop through all of the units without straddling a belt.

Upon each cherry cluster 44 straddling the upper run of one of the endless belts 16, such cluster is carried forward thereby and into engagement with the related sickle bar device 19; the stems 45 of the cluster passing into the notches 31, whence such stems are severed by the cutter teeth 33 of the reciprocable blade 20. Upon the stems 45 of each cluster 44 being so severed adjacent the nub 46, the individual cherries—with the remaining attached stem—fall downwardly to reception on the conveyor; such conveyor carrying the cherries forward for further processing, such as grading, etc.

As the lower runs of the endless belts 16 are carried quite closely beneath the upper runs there is little likelihood of cherry clusters being caught and carried rearwardly by said lower runs, and which would draw the cherries in the direction of the rear multiple-groove pulley shafts 14. However, to prevent any cherry clusters from so traveling rearwardly into the pulley shafts 14 the cluster cutting units A, B, and C are each provided with a depending baffle 47 attached by clips 48 to a cross rod 49; each depending baffle being slotted, as at 50, for passage of the belts in the next lowermost cluster cutting unit. The baffles 47 are of such vertical extent that the lower portion of each laps the upper portion of the next lowermost baffle. As so mounted, the baffles 47 are effective in the prevention of cherry clusters being carried back into the rear pulley shafts 14.

The cluster cutting units A, B, and C—i.e. each thereof, except the lowermost unit D—is provided, intermediate its ends and adjacent but above the endless belts 16 of the next lowermost unit, with a transverse shaft 51 journaled in connection with and spanning between the related side bars 13. Each such shaft 51 is driven, in the direction indicated, from the corresponding forward pulley shaft 15 by an endless belt 52.

Each shaft 51 is formed with a plurality of circumferentially spaced, full length, ribs or radial vanes 53; such vanes sweeping in relatively close proximity to the upper runs of the endless belts 16 of the next lowermost cluster cutting unit. The purpose of such action of the ribs or vanes 53 is to engage the nub 46 and to straighten any cherry cluster 44 that is traveling forwardly in an out-of-balance position on any such upper run. Additionally, the shafts 51 are each fitted throughout the length thereof with a multiplicity of opposed radial pins 54; such pins being disposed to sweep between the endless belts 16 but without engaging the same. The purpose of the pins 54 is to prevent any cherry cluster from undesirably spanning across or between two adjacent belts 16.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A cherry-cluster cutting machine comprising transversely spaced supporting members, a horizontally extending endless driven belt disposed between and mounted on the supports, the belt comprising an upper run and a lower run and being of relatively small-diameter form in section whereby to receive cherry clusters on the upper run in straddling relation with the nubs of the clusters on top, and a stem cutting device between the belt runs adjacent the forward end of the upper run relative to the direction of drive thereof to cut thru the stems of the clusters as the latter are advanced by the moving belt; the upper and lower runs of the belt back from the cutting device being relatively close to each other so that the cherries of the clusters will be below the lower run of the belt and their stems will be maintained against excessive lateral rocking movement about the belt supported nubs as an axis.

2. A cherry-cluster cutting machine comprising transversely spaced supporting members, a horizontally extending endless driven belt disposed between and mounted on the supports, the belt comprising an upper run and a lower run and being of relatively small-diameter form in section whereby to receive cherry clusters on the upper run in straddling relation with the nubs of the clusters on top, a stem cutting device between the belt runs adjacent the forward end of the upper run relative to the direction of drive thereof to cut thru the stems of the clusters as the latter are advanced by the moving belt, a transverse shaft journaled in and extending between the support members above the upper run of the belt some distance back from the cutting device, means to drive the shaft so that the bottom thereof turns rearwardly, and radial vanes projecting from the shaft in circumferentially spaced relation; the spacing of the shaft above the upper run of the belt being such that the vanes will be spaced from the belt sufficiently to engage the nub of any out-of-balance cluster riding forwardly on the belt and straddling said upper run thereof.

3. A cherry-cluster cutting machine comprising transversely spaced supporting members, a plurality of driven transversely spaced endless belts disposed between and mounted at a common level on the members, the upper runs of the belts being substantially horizontal and each being adapted to receive and support a cherry cluster thereon in straddling relation, a transverse driven shaft journaled in and extending between the supporting members some distance back from the cutting device, and radial pins projecting from the shaft of a length and in a lateral position to sweep between the upper runs of adjacent belts and engage and deflect the cluster-stems spanning across said belt runs.

References Cited in the file of this patent
UNITED STATES PATENTS

| | | |
|---|---|---|
| 1,729,269 | Jagenburg | Sept. 24, 1929 |
| 2,311,169 | Gordon et al. | Feb. 16, 1943 |
| 2,630,670 | Sherman | Mar. 10, 1953 |
| 2,742,068 | Metcalf | Apr. 17, 1956 |
| 2,825,375 | Gotelli et al. | Mar. 4, 1958 |
| 2,903,134 | Ashlock | Sept. 8, 1959 |
| 3,059,648 | Burton | Oct. 23, 1962 |